(12) United States Patent
Hwang et al.

(10) Patent No.: US 8,855,618 B2
(45) Date of Patent: Oct. 7, 2014

(54) APPARATUS AND METHOD FOR ADAPTIVELY OPERATING AN APPLICATION PROGRAM

(75) Inventors: Hyo Sun Hwang, Seoul (KR); Tae Rim Park, Seoul (KR); Jong Ae Park, Yongin-si (KR); Sung Jin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 173 days.

(21) Appl. No.: 13/303,476

(22) Filed: Nov. 23, 2011

(65) Prior Publication Data

US 2012/0178496 A1    Jul. 12, 2012

(30) Foreign Application Priority Data

Jan. 10, 2011    (KR) .................. 10-2011-0002319

(51) Int. Cl.
*H04M 3/00* (2006.01)
*H04W 52/02* (2009.01)

(52) U.S. Cl.
CPC ............................... *H04W 52/0264* (2013.01)
USPC ............ 455/418; 455/566; 715/772; 715/810

(58) Field of Classification Search
CPC .... H04W 8/245; H04W 88/06; G06F 3/0481; G06F 21/31
USPC ........................ 455/418, 426.1; 715/772, 741
See application file for complete search history.

(56) References Cited

U.S. PATENT DOCUMENTS

| | | | | |
|---|---|---|---|---|
| 6,131,046 A * | 10/2000 | Sano et al. | ..................... | 455/566 |
| 2002/0191029 A1* | 12/2002 | Gillespie et al. | .............. | 345/810 |
| 2005/0005249 A1* | 1/2005 | Hill et al. | ....................... | 715/963 |
| 2006/0069998 A1* | 3/2006 | Artman et al. | ................ | 715/721 |
| 2006/0107227 A1* | 5/2006 | Kiljander | ...................... | 715/772 |
| 2007/0016873 A1* | 1/2007 | Lindsay | ....................... | 715/781 |
| 2007/0243852 A1* | 10/2007 | Gibbs | ........................ | 455/343.5 |
| 2008/0113665 A1* | 5/2008 | Paas et al. | .................. | 455/426.1 |
| 2008/0200220 A1* | 8/2008 | Jackson | ........................ | 455/574 |
| 2009/0094554 A1* | 4/2009 | Karstens | ....................... | 715/810 |
| 2009/0158164 A1* | 6/2009 | Nadeem et al. | ................ | 715/741 |
| 2009/0172587 A1* | 7/2009 | Carlisle et al. | ................ | 715/781 |
| 2009/0196251 A1 | 8/2009 | Choi-Grogan et al. | | |
| 2010/0058087 A1* | 3/2010 | Borras et al. | ................... | 713/322 |
| 2010/0184512 A1* | 7/2010 | Evans et al. | ..................... | 463/31 |
| 2010/0223569 A1* | 9/2010 | Vuong et al. | .................. | 715/772 |
| 2010/0285785 A1* | 11/2010 | Wang et al. | ................... | 455/418 |

FOREIGN PATENT DOCUMENTS

| | | |
|---|---|---|
| KR | 10-2005-0080934 A | 8/2005 |
| KR | 10-2008-0086575 A | 9/2008 |
| KR | 10-2009-0077055 A | 7/2009 |

\* cited by examiner

*Primary Examiner* — Nathan Taylor
(74) *Attorney, Agent, or Firm* — NSIP Law (57) ABSTRACT

Provided is an apparatus for adaptively operating an application program that may control whether to activate the application program based on whether a status of at least one of a wireless channel and a battery satisfy requirements of the application program.

26 Claims, 9 Drawing Sheets

APPARATUS AND METHOD FOR ADAPTIVELY OPERATING AN APPLICATION PROGRAM

CROSS-REFERENCE TO RELATED APPLICATION(S)

This application claims the benefit under 35 U.S.C. §119(a) of Korean Patent Application No. 10-2011-0002319, filed on Jan. 10, 2011, in the Korean Intellectual Property Office, the entire disclosure of which is incorporated herein by reference for all purposes.

BACKGROUND

1. Field

The following description relates to an apparatus and method for adaptively operating an application program.

2. Description of Related Art

For a wireless device, a low power user terminal may have difficulty functioning due to low performance of the main hardware rather than performance of a wireless communication environment.

Recently, however, there has been considerable improvement in the performance of a central processing unit and a memory for a user terminal, thus resulting in an increase in energy efficiency, a reduction in size, and the like.

Due to the improved performance of hardware, various application programs have become easier to execute in wireless terminals. Also, usage of various applications based on real-time data transmission has increased. For example, surrounding information may be monitored in real-time based on location information sensed by a Global Positioning System (GPS). As another example, applications such as social networking, real-time games, and the like, may be executed in a user terminal.

Accordingly, energy consumption in a terminal is a critical issue.

SUMMARY

In one general aspect, there is provided an apparatus for adaptively operating an application program, the apparatus including an application program module comprising at least one application program, a monitoring module configured to monitor a status of at least one of a wireless channel and a battery, and a control module configured to adaptively control activation of the at least one application program based on whether the status of at least one of the wireless channel and the battery satisfy the requirements of the at least one application program.

The requirements may comprise information with respect to at least one of a data transmission rate, a packet delay time, an average frequency and extent of data occurrence, and an amount of battery usage, required by the at least one application program, and the application program module may be configured to register the requirements of the at least one application program with the control module.

The application program module may comprise a control unit configured to adaptively control activation of a menu function included in the at least one application program, based on the status of at least one of the wireless channel and the battery, and based on the requirements of the at least one application program.

The monitoring module may further comprise a communication status monitoring unit configured to monitor the status of the wireless channel that changes in real time, the control module may be configured to activate an application program if the status of the wireless channel satisfies the requirements of the at least one application program, and the control module may be configured to deactivate an application program if the status of the wireless channel fails to satisfy the requirements of the at least one application program.

The monitoring module may further comprise a power monitoring unit configured to monitor the status of the battery that changes in real time, the control module may be configured to activate an application program if the status of the battery satisfies the requirements of the at least one application program, and the control module may be configured to deactivate an application program if the status of the battery fails to satisfy the requirements of the at least one application program.

The control module may further comprise a storage unit configured to store information associated with the requirements of the at least one application program, a priority of occupation with respect to resources of the at least one application program, and the status of the wireless channel, and the control module may be configured to determine a priority in which the at least one application program uses the resources, based on the priority of occupation with respect to the information associated with the wireless channel, and with respect to the resources.

The control module may comprise a setting unit configured to change the appearance of at least one icon displayed on a screen of a user terminal, or a menu setting of the at least one application program, based on the status of at least one of the wireless channel and the battery, and based on the information stored in the storage unit.

The setting unit may be configured to display at least one icon on a screen of a user terminal by changing a display scheme of the at least one icon, or hides the at least one icon, based on the status of at least one of the wireless channel and the battery, and based on the information stored in the storage unit.

The change in display scheme of the at least one icon may comprise a change in at least one of color, clarity, chroma, brightness, size, position, and shape of the at least one icon, and a change in an image mapping, a three-dimensional (3D) effect, or an animation effect with respect to the at least one icon.

The setting unit may be configured to display a menu screen of the at least one application program on the screen of the user terminal, by resetting a display scheme of the menu screen of the at least one application program based on the status of at least one of the wireless channel and the battery, and based on the information stored in the storage unit.

In another aspect, there is provided a method of adaptively operating an application program, the method including monitoring a status of a wireless channel or a status of a battery that changes in real time, extracting requirements of at least one application program, and adaptively controlling whether to activate the at least one application program based on whether the status of at least one of the wireless channel and the battery satisfy the requirements of the at least one application program.

The method may further comprise registering the requirements of the at least one application program with a control module, wherein the requirements of the at least one application program comprise information with respect to at least one of a data transmission rate requested by the at least one application program, a packet delay time, an average frequency and extent of data occurrence, and an amount of battery usage.

In another aspect, there is provided a computer-readable storage medium having stored therein program instructions to cause a processor to execute a method of adaptively operating an application program, the method including monitoring a status of a wireless channel or a status of a battery that changes in real time, extracting requirements of at least one application program, and adaptively controlling whether to activate the at least one application program based on whether the status of at least one of the wireless channel and the battery satisfy the requirements of the at least one application program.

In another aspect, there is provided a method of operating an apparatus comprising a display and in which an application program is installed, the method including determining whether a status of the apparatus corresponds to a first mode in which the application program is executable, or corresponds to a second mode in which the application program is inexecutable, and displaying the first mode or the second mode based on a result of the determination.

The status of the apparatus may correspond to a status of a wireless channel used by the apparatus.

The status of the apparatus may correspond to a status of a battery of the apparatus.

The first mode may display a first form of an icon corresponding to the application program, and the second mode may display a second form of the icon corresponding to the application program, and the second form is different from the first form.

The first form of the icon may correspond to a colored icon, and the second form of the icon may correspond to a grayscale icon.

The first form of the icon may have a relatively low clarity in comparison to the second form, and the second form of the icon may have a relatively high clarity in comparison to the first form.

The first form of the icon may have a greater size in comparison to the second form.

The first form of the icon may have a shape that has an animation effect that is different from the shape of the second form.

In another aspect, there is provided a method of operating an apparatus in which an application program is installed, the apparatus displaying an icon corresponding to the application program that indicates the application program is executable, the method including monitoring a status of the apparatus, determining a status of the apparatus in which the application program is inexecutable, and displaying the icon by changing a form of the icon based on a result of the determination.

The status of the apparatus may correspond to a status of a wireless channel used by the apparatus.

The status of the apparatus may correspond to a status of a battery of the apparatus.

The icon, in the changed form, may correspond to a grayscale icon.

The icon, in the changed form, may correspond to an icon having a higher clarity.

The icon, in the changed form, may correspond to an icon having a smaller size.

The icon, in the changed form, may correspond to an icon having a shape changed by an animation effect.

In another aspect, there is provided a method of operating an apparatus configured to execute an application program and configured to display an icon corresponding to the application program that indicates that the application program is currently executable, the method including monitoring a status of the apparatus, determining whether the application program is currently inexecutable based on the status of the apparatus, and if the application program is currently inexecutable, changing a form of the displayed icon.

The status of the apparatus may correspond to a status of a wireless channel used by the apparatus.

The status of the apparatus may correspond to a status of a battery of the apparatus.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, description of well-known functions and constructions may be omitted for increased clarity and conciseness.

Figure 1:
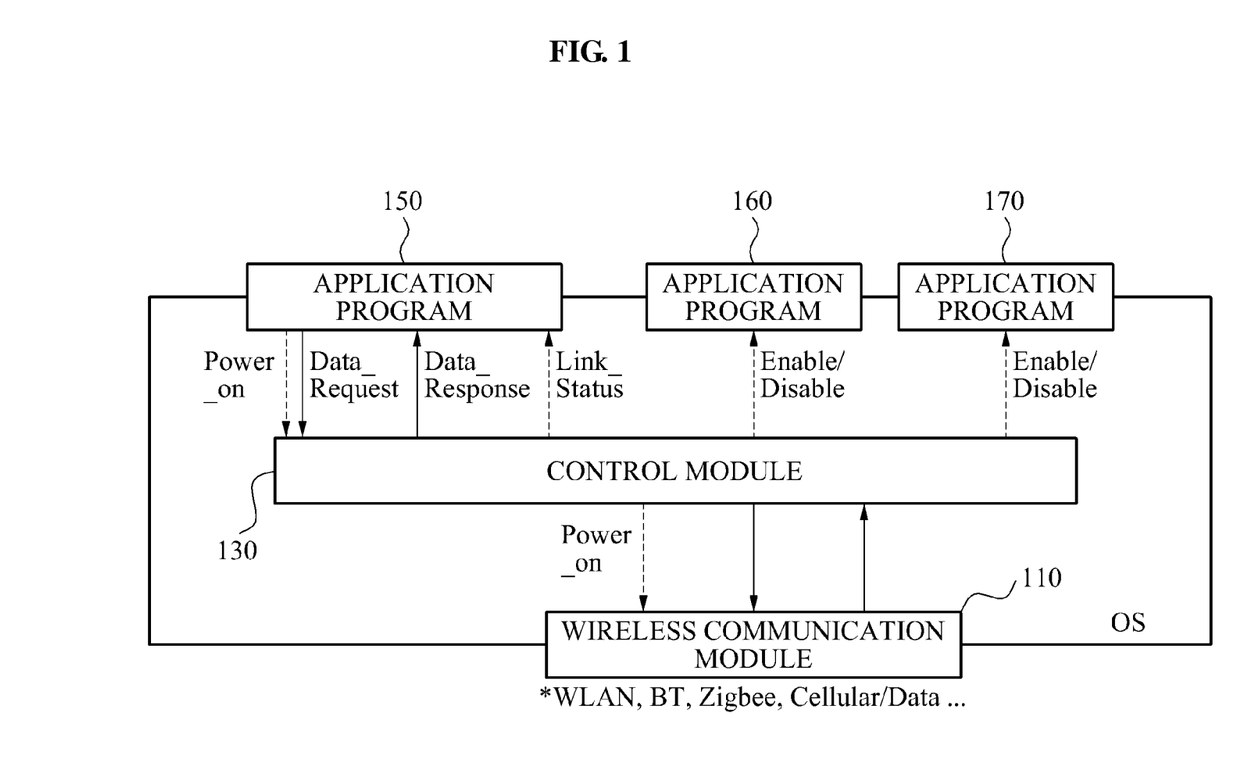
FIG. 1 is a diagram illustrating an example of an apparatus for adaptively operating an application program.

FIG. 1 illustrates an example of an apparatus for adaptively operating an application program. The apparatus may control an operation of at least one application program installed in a user terminal.

Generally, an application program that is installed in the user terminal may separately control a wireless communication module. For example, an application program A may activate a wireless communication module during an operation, and the wireless communication module may start data communication accordingly.

When the wireless communication module enables provision of a service quality requested by the application program A, for example, a data transmission rate, a user may use the application program A with satisfaction. However, the wireless communication module may fail to provide the service quality requested by the application program A, for example, because of interference and/or a distance from a wireless base station. In this example, the application program A may fail to properly operate. Accordingly, the user of the terminal may be dissatisfied with a performance of the application program A and may suspend the performance of the application program A.

When the user executes an application program B, the application program B may request data transmission using the wireless communication module, separately from the application program A, and performance of the application program B may suffer and may also be suspended by the user when a low service quality is provided by the wireless communication module.

Each application program may attempt to transmit data directly with the wireless communication module, and may determine a service status of the wireless communication module, or a status of a wireless channel based on a response with respect to the attempt, for example, transmission success, transmission failure, a response time, and the like. Each application program may independently perform a determination of the service situation of the wireless communication module. Accordingly, when application programs are executed in a region that has a poor communication environment, unnecessary transmission and reception to and from the wireless communication module may occur, and power consumption of the user terminal may be increased.

In order to overcome the aforementioned problems, the apparatus for adaptively operating the application program may control a usage of the application programs installed in the user terminal based on a status of a wireless channel in an operating system (OS) that may monitor the service situation of the wireless communication module and/or the wireless channel.

For example, the application program may include various application programs that may be operated in a user terminal, a service, a function, resources, and the like.

Referring to FIG. 1, a system including the apparatus for adaptively operating the application program includes a wireless communication module 110, a control module 130, and various types of application programs such as an application program 150, an application program 160, and an application program 170.

The control module 130 may activate an executable application program based on a status of a currently accessible wireless channel that is received from the wireless communication module 110. For example, the status may be based on a data transmission rate, and the like. Also, the control module 130 may deactivate an application program of which performance may be limited based on the status of the wireless channel.

As another example, the control module 130 may activate or deactivate multiple functions that are executed in an activated application program based on the status of the wireless channel, a status of a battery, and/or other various conditions.

Generally, the user terminal may display the communication environment as an icon in a form of an antenna to enable a user of the terminal to predict a speech quality. However, it may be difficult for the user to predict a communication quality or the communication environment with respect to each of a plurality of the application programs 150, 160, and 170 that may require various communication qualities.

Accordingly, the apparatus for adaptively operating the application program may indicate, to a user, whether each of the plurality of the application programs 150, 160, and 170 may operate based on a quality of the wireless communication and/or the situation of the communication. Thus, dissatisfaction with respect to the various types of applications installed in the user terminal, and with respect to the user terminal, may be reduced.

For example, a wireless device such as a smart phone may operate the various application programs 150, 160, and 170 that may use data to be transmitted and received using the wireless communication module 110.

In this example, each of the application programs 150, 160, and 170 may have a difference in a data transmission rate, a packet delay time, and a required amount of data, for example, an average frequency of occurrence, an extent, and the like, that each of the application programs 150, 160, and 170 may require. As another example, each application program may have a characteristic of the wireless channel that may be changed in real time, due to mobility of the wireless device. The control module 130 may control whether to activate each of the application programs 150, 160, and 170 based on the status of the wireless channel that may change in real time.

When an application program is initially installed in the user terminal, the application program may register, with the control module 130, one or more requirements such as a data transmission rate, an amount of battery usage, and the like, that the application program itself may require. For example, the requirements that may be registered with the control module 130 may include information about an extent of the data transmission rate such as a maximum data transmission rate, a minimum data transmission rate, and an average data transmission rate, and a maximum packet delay time, or an average packet delay time, an average frequency and extent of occurrence such as a burst, 10 s, 1 s, and 1 m, and the like.

The control module 130 may monitor a channel situation of activated communication devices in the wireless communication module 110, for example, status information of the channel, and the like. The wireless communication module 110 may include communication devices for various communication schemes, for example, a cellular network, a Wireless Local Area Network (WLAN), BT, Zigbee, and the like.

The control module 130 may determine an application program that the user may satisfactorily use by comparing the one or more requirements of each of the application programs based on the channel situation.

For example, if the application program A is executable in the current channel situation, the control module 130 may activate the application program A, and if the current channel situation fails to sufficiently support the application program A, the control module 130 may deactivate the application program A.

In this example, to activate or deactivate the application program A may include activating or deactivating an operation of the corresponding application program, and may also include activating or deactivating an icon displayed on a screen that corresponds to the application program. For example, an activated icon may have a difference in color, clarity, chroma, brightness, size, position, shape, an image mapping with respect to at least one icon, a three-dimensional (3D) effect, or an animation effect, in comparison to a deactivated icon, based on each communication satisfaction level, such as the current channel situation, the data transmission rate, and the like.

Figure 2:
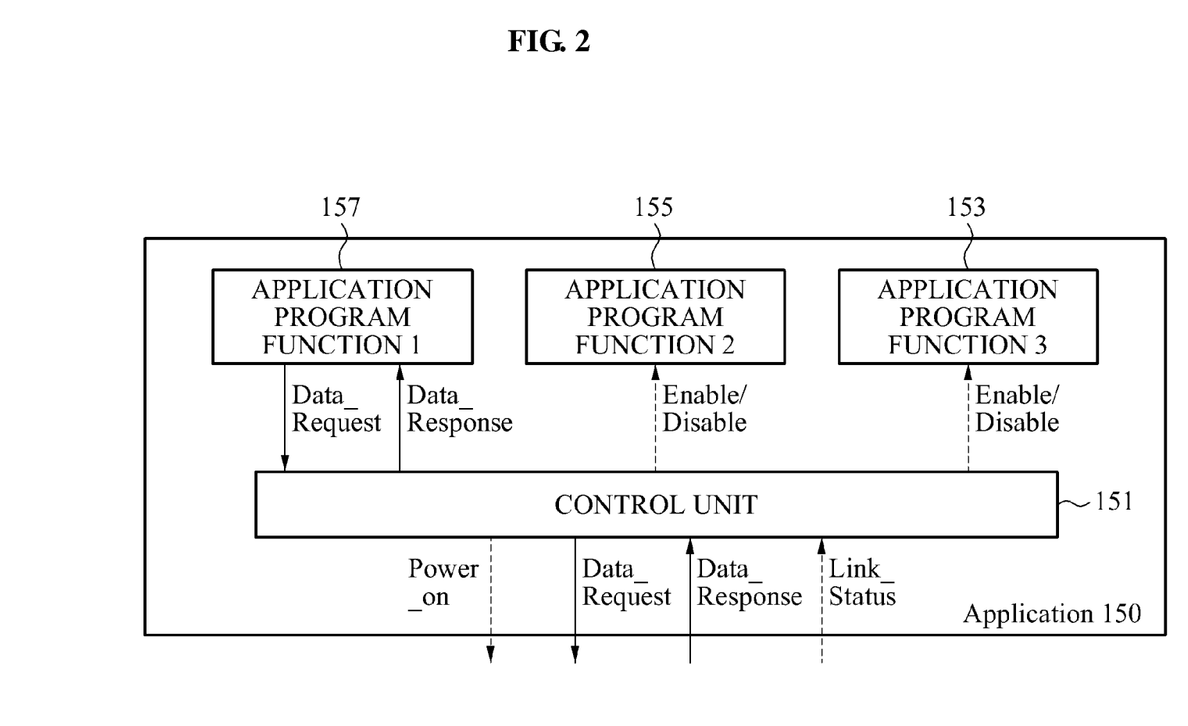
FIG. 2 is a diagram illustrating an example of a plurality of functions that may be included in at least one application program.

FIG. 2 illustrates an example of a plurality of functions that may be included in any one of the application programs illustrated in FIG. 1. The plurality of functions may be controlled by a control unit. In this example, the application program 150 of FIG. 1 is activated.

A control unit 151 may determine whether to activate each detailed function based on the status of the wireless communication, from among detailed functions of the activated application program 150.

For example, information on the status of the wireless channel that the control module 130 may have received from the wireless communication module 110, and other information, may be used to determine whether to activate each of the detailed functions of the application program 150.

Among the detailed functions of the application program 150, for example, a function 1 157, a function 2 155, and a function 3 153, the control unit 151 may determine the function 1 157 to be operable, and may determine the function 3 153 to be inoperable, based on the status of the wireless channel.

In this example, the control unit 151 may activate the function 1 157 and may either deactivate the function 3 153 or hide the corresponding function, from a menu of the corresponding application program.

In order to perform the aforementioned function, the control unit 151 may correspond to an operating system (OS) installed in a wireless device, or a form of firmware, that may manage overall resources of the wireless device. Also, the control unit 151 may include an associated library used for communication with each of the application programs that may be executed in the wireless device.

Figure 3:
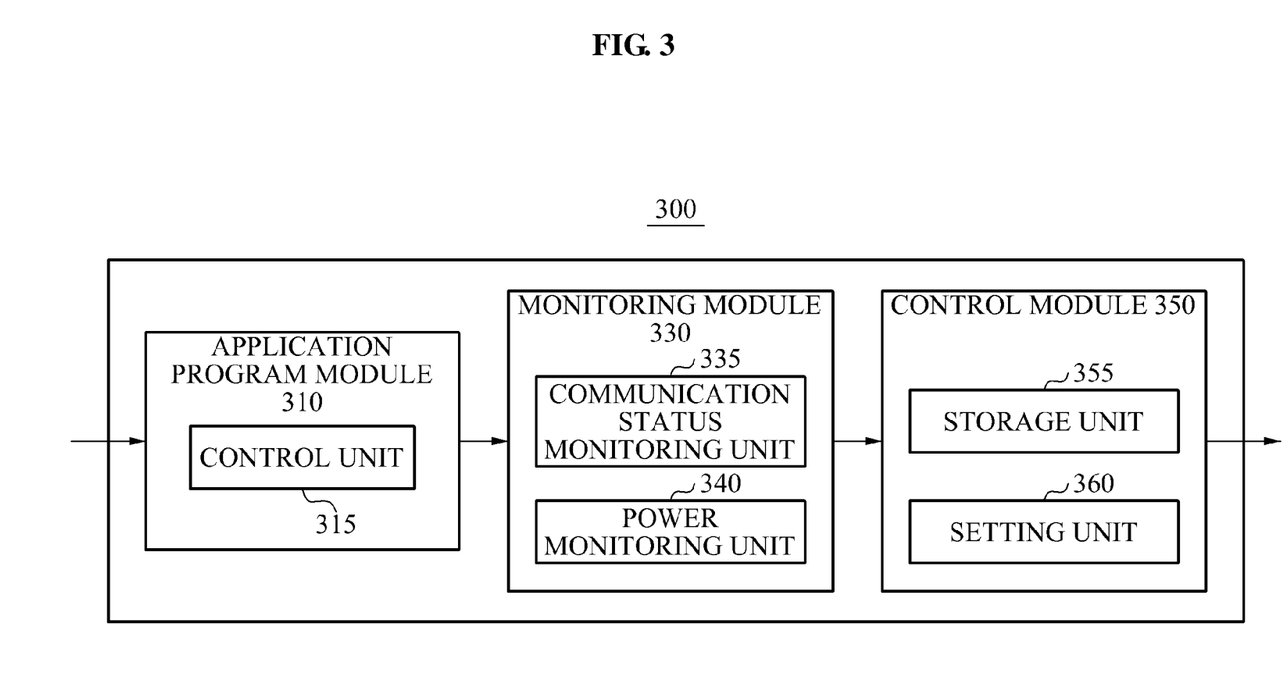
FIG. 3 is a diagram illustrating another example of an apparatus for adaptively operating an application program.

FIG. 3 illustrates another example of an apparatus for adaptively operating an application program.

Referring to FIG. 3, apparatus 300 for adaptively operating the application program includes an application program module 310, a monitoring module 330, and a control module 350.

The application program module 310 may include at least one application program, and may register one or more requirements of the at least one application program with the control module 350.

The application program module 310 may include a control unit 315 that may adaptively control whether to activate a function corresponding to a menu that is included in the at least one application program, based on a status of a wireless channel, a status of a battery, and/or based on the requirements of the at least one application program.

The monitoring module 330 may monitor the status of the wireless channel and the status of the battery. The monitoring module 330 may further include a communication status monitoring unit 335 and a power monitoring unit 340. For example, the communication monitoring unit 335 may monitor the status of the wireless channel that may change in real time, using the wireless communication module 110 as illustrated in FIG. 1. Also, the power monitoring unit 340 may monitor the status of the battery that may change in real time.

The control module 350 may adaptively control whether to activate the at least one application program, based on whether one or more of the requirements of the at least one application program satisfy the status of the wireless channel and/or the status of the battery.

For example, the requirements of the at least one application program may include information with respect to at least one of a data transmission rate, a packet delay time, an average frequency and extent of data occurrence, and an amount of battery usage, requested by the at least one application program.

The control module 350 may activate an application program if the requirements of the at least one application program satisfy the status of the wireless channel, and may deactivate an application program if the requirements of the at least one application program fail to satisfy the status of the wireless channel.

Also, the control module 350 may activate an application program if the requirements of the at least one application program satisfy the status of the battery, and may deactivate an application program if the requirements of the at least one application program fail to satisfy the status of the battery.

The control module 350 may further include a storage unit 355 and a setting unit 360.

The storage unit 355 may store information, for example, information that is associated with the requirements of each of the at least one application programs, a priority of occupation with respect to resources of each of the at least one application program, a status of the wireless channel, and the like.

The control module 350 may determine a priority in which the at least one application program may use the resources, based on the priority of occupation with respect to the information associated with the wireless channel, and with respect to the resources. An example of this is described with reference to FIG. 9.

The setting unit 360 may change the appearance at least one icon that is displayed on a screen of a user terminal, or a menu setting of the at least one application program, based on the status of the wireless channel or the status of the battery, and based on the information stored in the storage unit 355.

The setting unit 360 may display the at least one icon on the screen of the user terminal by changing a display scheme of the at least one icon, or may hide the at least one icon, based on the status of the wireless channel or the status of the battery, and based on the information stored in the storage unit 355.

For example, the display scheme of the at least one icon may include a change in color, clarity, chroma, brightness, size, position, and shape of the at least one icon, and a change in an image mapping, a 3D effect, or an animation effect of the at least one icon.

The setting unit 360 may classify an icon corresponding to the activated application program by changing the icon into a predetermined form. The icon corresponding to the activated application program is hereinafter referred to as an executable icon. That is, the executable icon may be changed in color, clarity, brightness, chroma, and the like, may be changed in a size to be greater or smaller than a size of an icon corresponding to the deactivated application program, and may be displayed by changing a combination of the above factors. The icon corresponding to the deactivated application program is hereinafter referred to as an inexecutable icon.

The setting unit 360 may apply a 3D effect to the icon. For example, the setting unit 360 may set the executable icon to protrude forward, to be depressed backward, and to be skewed left, right, or in a diagonal direction.

The setting unit 360 may display the 3D effect by incorporating a predetermined image to the icon. For example, the setting unit 360 may apply a 3D form of a smiling shape to the executable icon, and may apply a 3D form of a melting shape to the inexecutable icon.

As another example, the setting unit 360 may classify the icon into the executable icon and the inexecutable icon, by changing a position of the icon. For example, the setting unit 360 may display the icon by changing the position of the icon to be upward, downward, left, right, and in a diagonal direction, or by mapping the icon on a content image of a background screen picture. As an example, the background screen picture may correspond to a picture of a dragon, the executable icon may be disposed on a section corresponding to the head of the dragon, and the inexecutable icon may be disposed on a section corresponding to the tail of the dragon.

The setting unit 360 may classify the icon into the executable icon and the inexecutable icon by applying the animation effect to the icon. For example, the setting unit 360 may change a speed of change of the icon having the animation effect, or may change a changed shape of the icon having the animation effect.

In addition, the setting unit 360 may set a point in time of displaying the icon. For example, the setting unit 360 may display the icon only when a cursor is on the icon, or may constantly display the aforementioned effects with respect to all icons regardless of a position of the cursor.

The setting unit 360 may display a menu screen of the at least one application program on the screen of the user terminal, by resetting a display scheme of the menu screen of the at least one application program based on the status of the wireless channel, the status of the battery, and/or the information stored in the storage unit 355.

The setting unit 360 may reset the icon that is displayed on the screen of the user terminal, or the display scheme of the menu screen of the at least one application program, if the status of the wireless channel, the status of the battery, and/or the information stored in the storage unit 355 are periodically changed.

For example, to reset the display scheme may include displaying a different color of the corresponding menu, hiding an inexecutable function among detailed functions from the menu, and changing the corresponding menu screen by various effects that may be applicable to the icon.

Figure 4:
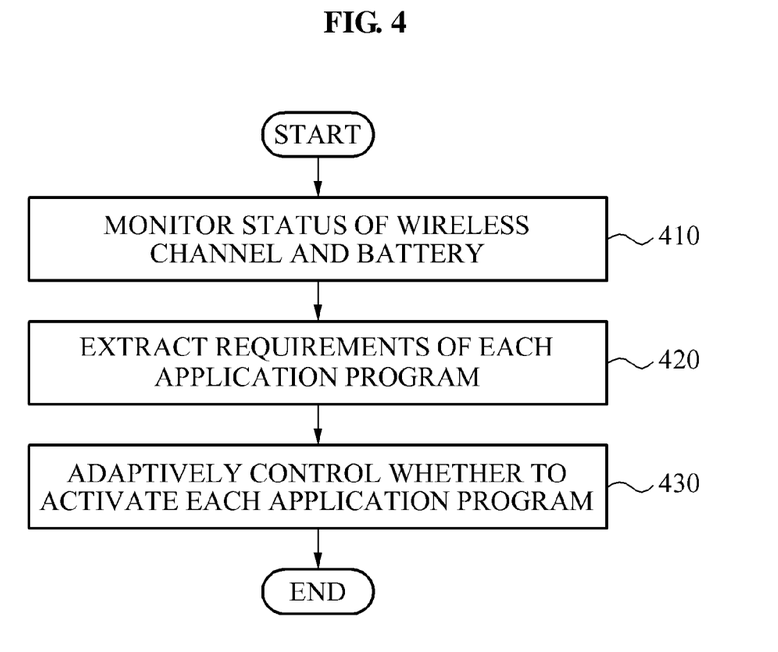
FIG. 4 is a flowchart illustrating an example of a method of adaptively operating an application program.

FIG. 4 illustrates an example of a method of adaptively operating an application program.

Referring to FIG. 4, a status of a wireless channel and a status of a battery that may change in real time is monitored, in 410, and requirements of each of at least one application program is extracted, in 420.

In 430, the method adaptively controls whether to activate each of the at least one application program, based on whether the requirements of the each of the at least one application program satisfy the status of the wireless channel or the status of the battery.

Other methods of adaptively operating the application program include the description with respect to the apparatus for adaptively operating the application program of FIG. 3.

Figure 5:
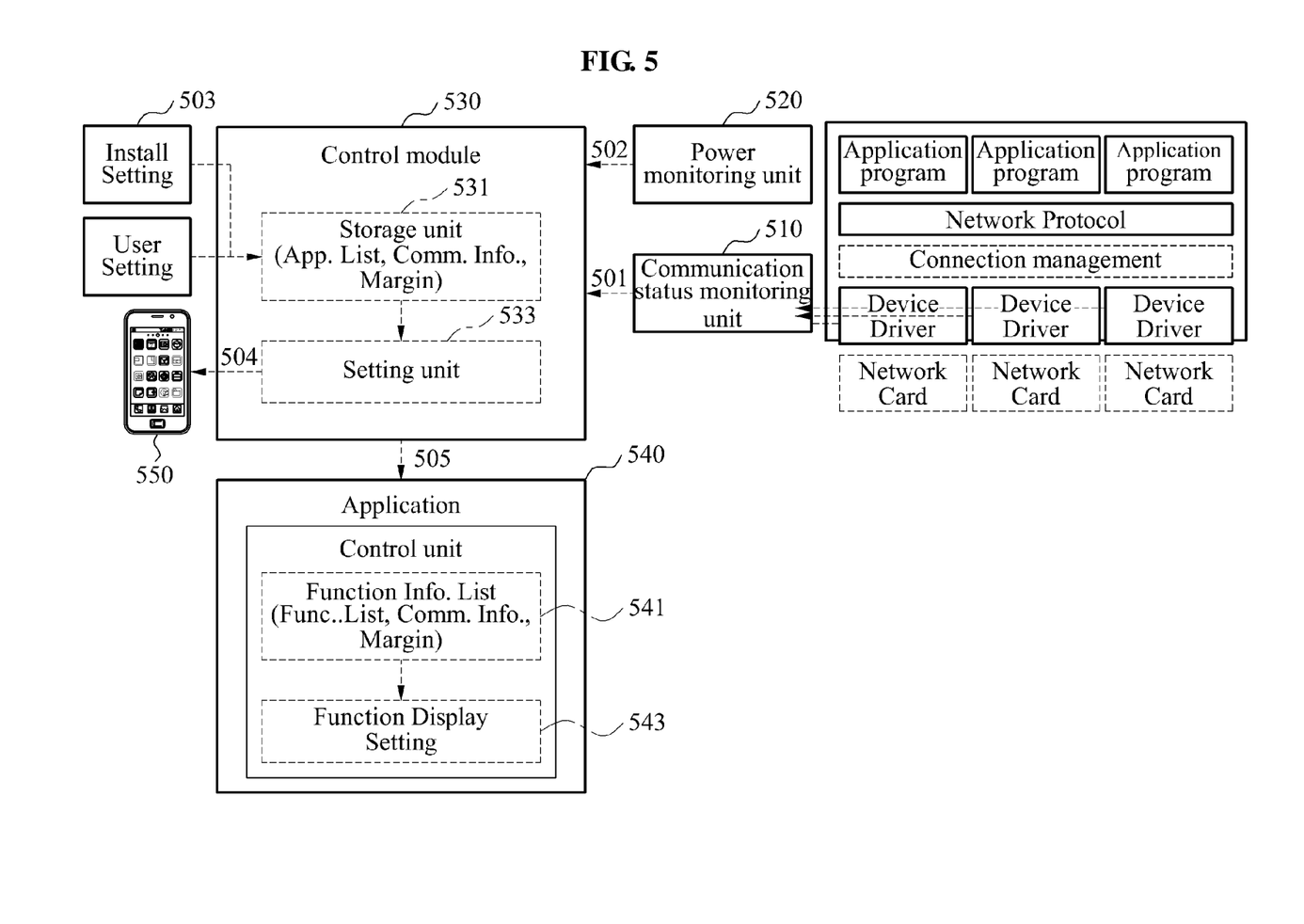
FIG. 5 is a diagram illustrating an example of applying an apparatus for adaptively operating an application program to a graphical user interface (GUI).

FIG. 5 illustrates an example of applying an apparatus for adaptively operating an application program to a graphical user interface (GUI).

Referring to FIG. 5, a communication status monitoring unit 510 may transfer a monitored network status to a control module 530, in 501. For example, a network status may be monitored by a respective device driver for each network card and a status of a wireless channel, and the like, may be transferred in 501.

A power monitoring unit 520 may monitor a remaining amount of a power of a wireless device, and may transfer a monitoring result to the control module 530, in 502.

In this example, one or more requirements of each application program may be stored in a storage unit 531 at a time of installing the corresponding application program, in 503, and a user may directly set the requirements of the corresponding application program.

The setting unit 533 may change an icon that is displayed on a screen of a user terminal, or may change a screen setting of a menu of the application program, based on information collected from the communication status monitoring unit 510, the power monitoring unit 520, and the storage 531, in 504 and 505.

The screen setting of the menu of the application program may be changed by a control unit 540 that may control detailed functions of each of the application programs. The requirements for each of the detailed functions may be stored in a function information list 541.

A function display setting unit 543 may change the screen setting with respect to the detailed functions of the menu based on whether the requirements for the application program are satisfied, using the information stored on the function information list, and the information collected by the setting unit 533.

Figure 6:
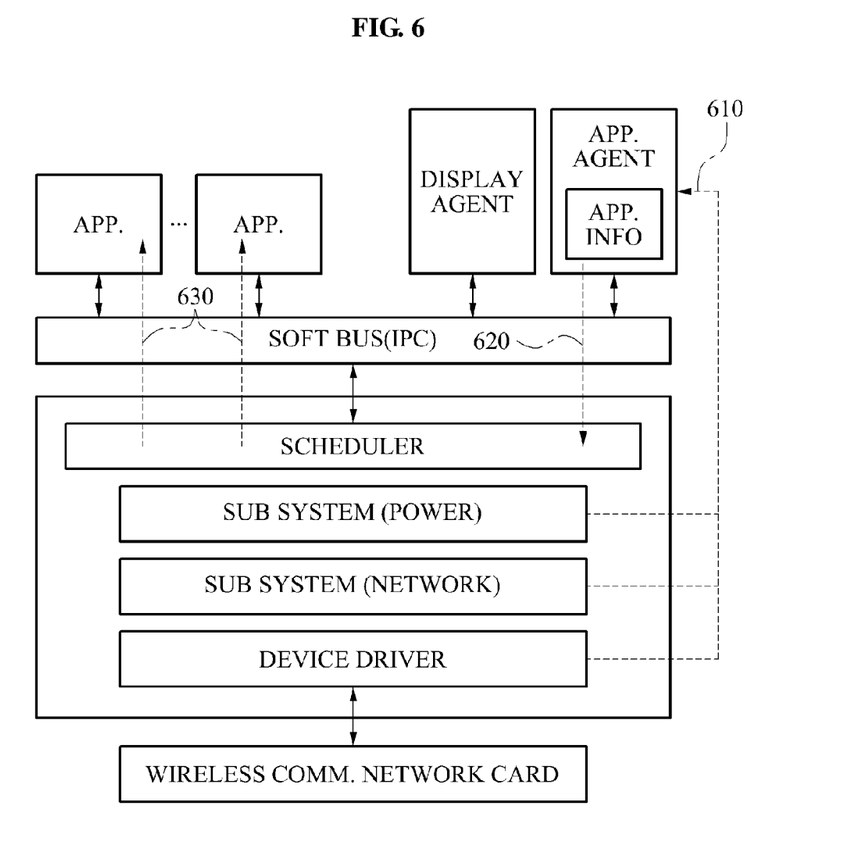
FIG. 6 is a diagram illustrating an example of a configuration of an operating system (OS) interface applied to an apparatus for adaptively operating an application program.

FIG. 6 illustrates an example of a configuration of an operating system (OS) interface applied to an apparatus for adaptively operating an application program.

In 610, an application agent may store information about a status of a wireless channel, and a status of a power of a battery by receiving the information from a sub system of the OS, a device driver, and the like.

In 620, the application agent may report, to the OS, details on a control with respect to each application program. Then, the OS may provide each application program with the corresponding information, or may directly control each application program based on the corresponding information, in 630.

Figure 7:
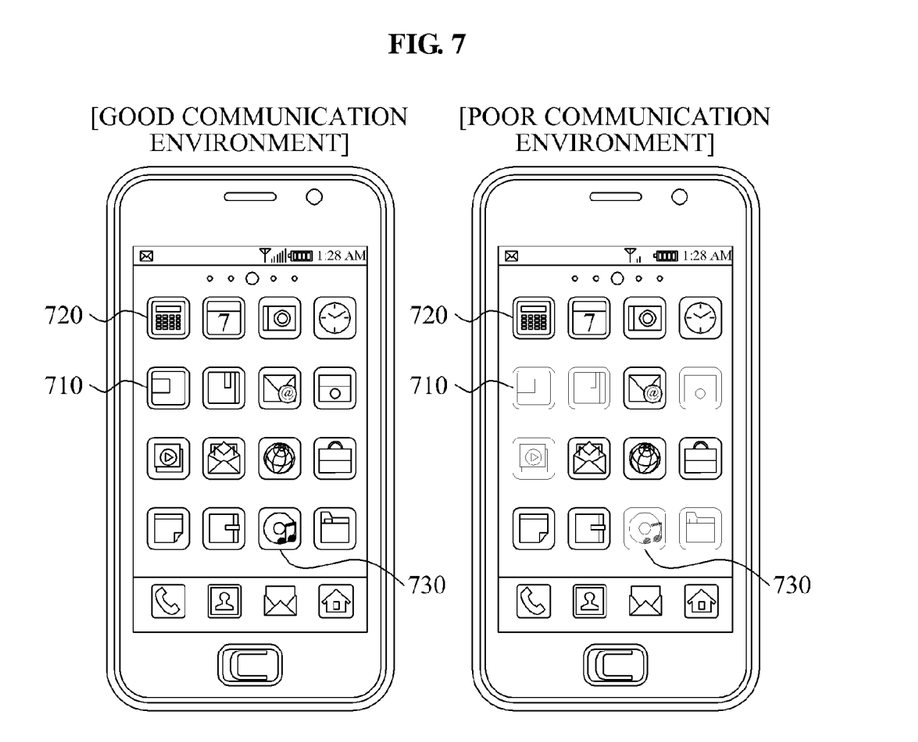
FIG. 7 is a diagram illustrating an example of a display for adaptively operating an application program based on a status of a wireless channel.

FIG. 7 illustrates an example of a display for adaptively operating an application program based on a status of a wireless channel.

A plurality of application programs that may be operated in the user terminal, such as a smart phone, may be classified into an operable application program and an inoperable application program based on a wireless communication status. For example, an application program A 710 may require a WiFi communication or a Zigbee communication, an application program C 730 may require a high data transmission rate, and an application program B 720 may be operable at a low data transmission rate and may require a cellular communication.

When the WiFi communication or the Zigbee communication is unavailable, application program A 710 may fail to provide a user with a sufficient service. In this example, if application program A 710 constantly senses a status of the corresponding channel, power consumption may be increased, which may influence operations of other application programs.

Similarly, when a data transmission rate of the corresponding channel is low, application program C 730 may fail to provide the user with a sufficient service. Accordingly, the apparatus may activate the application program A 710 only if the WiFi communication or the Zigbee communication is available, and may activate the application program C 730 only if the data transmission rate is high. If the WiFi communication or the Zigbee communication is unavailable, or the corresponding communication quality is poor, the apparatus may deactivate the corresponding application programs.

In a case of the application program B 720 that may be operable at the low data transmission rate, and may require the cellular communication, the apparatus may always activate the application program B 720 because the application program B 720 may be operable in any situation.

For example, the activation with respect to the corresponding application program may include activation of an operation of the corresponding application program, activation with of a display of an icon, with respect to the corresponding application program, and maintenance of the corresponding application program in a sleep mode.

For example, a scheme of displaying an icon that may be executable or inexecutable with respect to the corresponding application program may include various display schemes such as a scheme of applying a gradation effect to the corresponding icon, a scheme of applying a change in color, clarity, chroma, brightness, size, position, and shape, an image mapping, a 3D effect, or an animation effect of the icon, and the like.

For example, if the corresponding application program is activated, the corresponding application program may be displayed as a colored icon, and if the corresponding application program is deactivated, the corresponding application program may be displayed as a grayscale icon. As another example, the activated application program may be displayed as an icon that has a high clarity, a great icon, or a stationary icon, and the deactivated icon may be displayed as an icon that has a low clarity, a small icon, or icon that has a shape changed by the animation effect. Various display schemes may be applicable in order to distinguish a status of the activation or the deactivation.

As illustrated in FIG. 7, the icon of the executable application program may be clearly displayed, and the icon of the inexecutable application program may be hidden on the display of the user terminal, based on the status of various wireless channels.

The apparatus may enable a user of the terminal to intuitively know whether the corresponding application program is currently executable, for example, whether it is possible to execute the application program, or a rate of success in execution. Also, power consumption due to a constant sense of a channel in the poor communication situation may be reduced.

Figure 8:
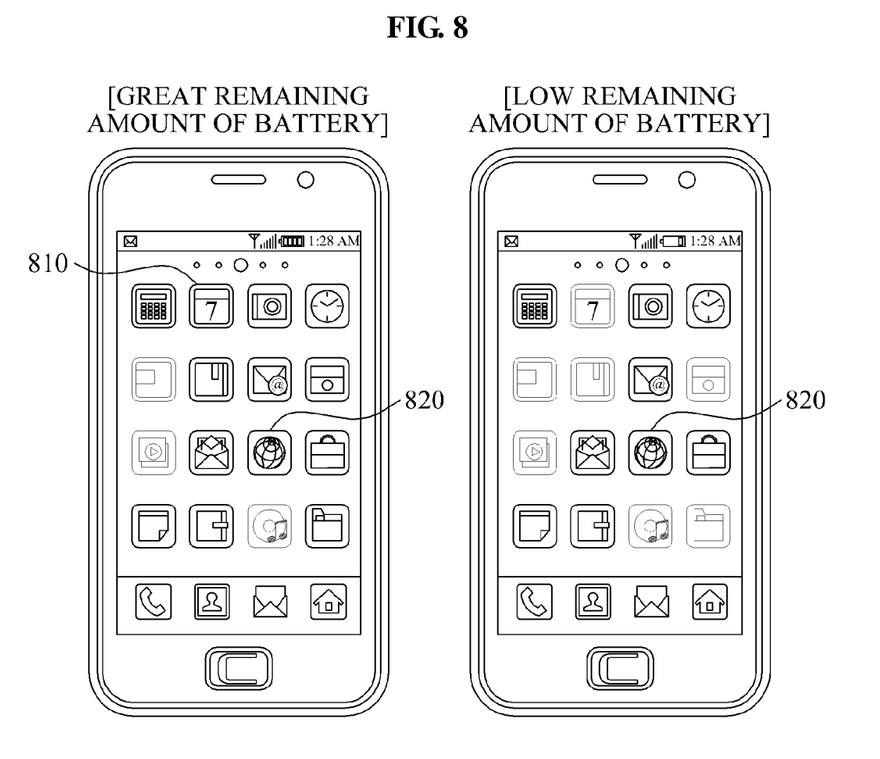
FIG. 8 is a diagram illustrating an example of a display for adaptively operating an application program based on a status of a battery.

FIG. 8 illustrates an example of a display for adaptively operating an application program based on a status of a battery.

A plurality of application programs that may be operated in the user terminal such as a smart phone, may be classified into an operable application program and an inoperable application program based on the status of a battery of the user terminal. In this example, the apparatus may determine whether to execute the application program based on a remaining amount of power in the battery.

For example, an application program A 810 may consume a great amount of battery power, an application program C 820 may consume a lower amount of battery power, and a currently remaining amount of battery power may be low, for example, about 40%.

If the remaining amount of battery is low, the apparatus for adaptively operating the application program may activate application programs having a high possibility of execution such as programs having a possibility of execution of 95% or greater.

For example, if the currently remaining amount of battery power is as low as about 40%, the apparatus may activate only the application program C 820 that may consume a lower amount of battery power. Here, there may be an increase in an amount of battery power consumption occurring when an application program constantly attempts operation. For example, an application program that has an execution rate that is low, however, which requires a great remaining amount of battery, that is, the application program that may consume a great deal of battery power, may constantly attempt an operation. However, the apparatus may reduce the amount of battery consumption in the aforementioned case.

Also, if the remaining amount of the battery power is great, the apparatus may activate application programs having less of a possibility of execution, for example, applications having a possibility of execution over 70%.

For example, if the remaining amount of the current battery power is as great as about 90%, the apparatus may activate the application program A 810 that may consume a great deal of battery power as well. Here, the execution rate with respect to the application programs may be increased, however, energy consumption may be great.

As an example, the information with respect to possibility of execution of the application program may be registered when the corresponding application program is installed in the user terminal in conjunction with the requirements of the application program, or may be directly set by the user.

Figure 9:
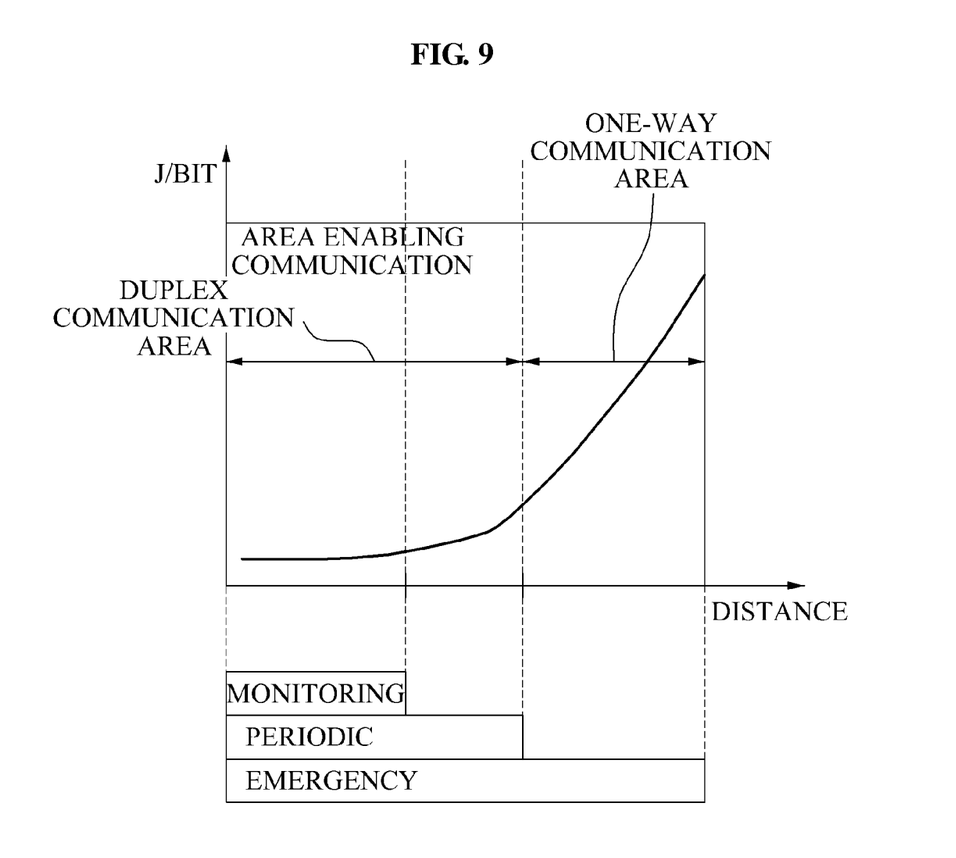
FIG. 9 is a diagram illustrating an example for adaptively operating an application program that controls a health care application program.

FIG. 9 illustrates an example for adaptively operating an application program that controls a health care application program.

Referring to FIG. 9, an application program including a module to sense a signal of a human body and a management module to collect information with respect to the signal of the human body, may be installed in a user terminal, for example, a smart phone.

The user may execute a first function to monitor the signal of the human body in real time using the application program of the smart phone, a second function to periodically collect data, and a third function to normally suspend a communication and to transmit the data when an emergency situation occurs. The first function may be referred to as a monitoring function that has a short period of communication, the second function may be referred to as a periodic function that has a long period of communication for reduction in power consumption, and the third function may be referred to as an emergency function.

In this example, a data transmission rate is highest for the first function corresponding to the monitoring function, followed by the second function corresponding to the periodic function, and then for the third function corresponding to the emergency function.

A graph of FIG. 9 indicates an example of a rate of energy consumption per transmission bit according to a distance, that is, J/bit, when the module to sense the signal of the human body, and the management module to collect information with respect to the signal of the human body perform a wireless communication. In the graph, as the distance apart increases a status of the wireless communication becomes worse and accordingly more power is consumed for transmission.

In the example in FIG. 9, in a duplex communication area, the first function, the second function, and the third function are operable at a section with a low rate of energy consumption, and the second function and the third function are operable at a section with a rate of energy consumption greater than a predetermined standard. In a one-way communication area, only the third function is operable.

In this example, the apparatus may provide the user with the application program by activating execution of all the functions of the application program if a status of a wireless channel or a status of a battery is great, and activate only the third function corresponding to the emergency function if the status of the wireless channel or the status of the battery is poor.

As described in various examples, the apparatus for adaptively operating the application program may control an operation of an application program based on the status of the wireless channel, or other various situations, thereby reducing unnecessary energy consumption due to a constant sense of the wireless channel by the application program The apparatus of adaptively operating the application program may adaptively control whether to activate the application program based on the status of the wireless channel and/or the status of the battery. Accordingly, the user may intuitively recognize the status of the wireless channel and whether an application program is executable. Furthermore, energy unnecessarily consumed in the user terminal may be reduced.

In some embodiments, the application program may be installed in another device that is separate from the apparatus for adaptively operating the application program. For example, the application program may be installed in a cloud computing system that the apparatus may interact with. The apparatus may display an icon corresponding to an application program offered by the cloud computing system. The icon may indicate the status of whether the application program is executable or not.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for adaptively operating an application program, the apparatus comprising:
   an application program module comprising a plurality of application programs;
   a monitoring module configured to monitor a status of a wireless channel; and
   a control module configured to determine a priority of occupation of the wireless channel for the plurality of application programs based on one or more features of the plurality of application programs, and to adaptively activate and deactivate an application program based on whether the status of the monitored wireless channel satisfies respective requirements of the application program and based on the determined priority of occupation for the plurality of application programs, the control module comprising:
   a setting unit configured to change an appearance of a menu setting of the application program on a screen of a user terminal, by resetting a display scheme of the menu screen of the application program based on the status of the wireless channel, information about the respective requirements of the application program, and the determined priority of occupation for the plurality of application programs,
   wherein the resetting comprises at least one of displaying a different color of the corresponding menu, hiding an inexecutable function among functions from the menu, and changing the corresponding menu screen by effects that are applicable to an icon.

2. The apparatus of claim 1, wherein:
   the requirements of an application program comprise information with respect to at least one of a data transmission rate, a packet delay time, and an average frequency and extent of data occurrence, required by the respective application program, and
   the application program module is configured to register the requirements of the application program with the control module.

3. The apparatus of claim 1, wherein the application program module comprises a control unit configured to adaptively control activation of a menu function included in the application program, based on the status of the wireless channel, and based on the respective requirements of the application program.

4. The apparatus of claim 1, wherein:
   the monitoring module further comprises a communication status monitoring unit configured to monitor the status of the wireless channel that changes in real time,
   the control module is configured to activate an application program if the status of the wireless channel satisfies the requirements of the application program, and the control module is configured to deactivate the application program if the status of the wireless channel fails to satisfy the requirements of the application program.

5. The apparatus of claim 1, wherein:
the monitoring module further comprises a power monitoring unit configured to monitor the status of a battery that changes in real time,
the control module is configured to activate an application program if the status of the battery satisfies a predetermined threshold of the application program, and
the control module is configured to deactivate the application program if the status of the battery fails to satisfy the predetermined threshold of the application program.

6. The apparatus of claim 1, wherein:
the control module further comprises a storage unit configured to store information associated with the one or more requirements of the at least one application program, the priority of occupation with respect to resources of the at least one application program, and the status of the wireless channel.

7. The apparatus of claim 6, wherein the setting unit is further configured to change the appearance of at least one icon displayed on a screen of a user terminal, based on the status of the wireless channel, and based on the information stored in the storage unit.

8. The apparatus of claim 6, wherein the setting unit is configured to display at least one icon on the screen of the user terminal by changing a display scheme of the at least one icon, or hides the at least one icon, based on the status of the wireless channel, and based on the information stored in the storage unit.

9. The apparatus of claim 8, wherein the change in display scheme of the at least one icon comprises a change in at least one of color, clarity, chroma, brightness, size, position, and shape of the at least one icon, and a change in an image mapping, a three-dimensional (3D) effect, or an animation effect with respect to the at least one icon.

10. The apparatus of claim 1, wherein the control module is further configured to activate and deactivate a plurality of individual functions performed by an application program based on the status of the wireless channel.

11. The apparatus of claim 1, wherein the control module is further configured to keep active one function of the application program and to deactivate another function of the application program based on a same status of the wireless channel.

12. The apparatus of claim 1, wherein the control module adaptively activates and deactivates the at least one application program without a user request.

13. A method of adaptively operating an application program, the method comprising:
monitoring a status of a wireless channel that changes in real time;
extracting requirements of a plurality of application programs;
determining a priority of occupation of the wireless channel for the plurality of application programs based on one or more features of the plurality of application programs;
adaptively activating and deactivating an application program based on whether the status of the monitored wireless channel satisfies the respective requirements of the application program, and based on the determined priority of occupation for the plurality of application programs; and
changing an appearance of a menu setting of the application program on a screen of a user terminal, by resetting a display scheme of the menu screen of the application program based on the status of the wireless channel, information about the respective requirements of the application program, and the determined priority of occupation for the plurality of application programs,
wherein the resetting comprises at least one of displaying a different color of the corresponding menu, hiding an inexecutable function among functions from the menu, and changing the corresponding menu screen by effects that are applicable to an icon.

14. The method of claim 13, further comprising:
registering the respective requirements of the plurality of application programs with a control module,
wherein the requirements of an application program comprise information with respect to at least one of a data transmission rate requested by the application program, a packet delay time, and an average frequency and extent of data occurrence.

15. A non-transitory computer-readable storage medium having stored therein program instructions to cause a processor to execute a method of adaptively operating an application program, the method comprising:
monitoring a status of a wireless channel that changes in real time;
extracting requirements of a plurality of application programs;
determining a priority of occupation of the wireless channel for the plurality of application programs based on one or more features of the plurality of application programs;
adaptively activating and deactivating an application program based on whether the status of at least one of the wireless channel satisfies the respective requirements of the application program, and based on the determined priority of occupation for the plurality of application programs; and
changing an appearance of a menu setting of the application program on a screen of a user terminal, by resetting a display scheme of the menu screen of the application program based on the status of the wireless channel, information about the respective requirements of the application program, and the determined priority of occupation for the plurality of application programs,
wherein the resetting comprises at least one of displaying a different color of the corresponding menu, hiding an inexecutable function among functions from the menu, and changing the corresponding menu screen by effects that are applicable to an icon.

16. A method of operating an apparatus comprising a display and in which a plurality of application programs are installed, the method comprising:
determining whether a status of a wireless channel corresponds to a first mode in which an application program from the plurality of application programs is executable, or corresponds to a second mode in which the application program is inexecutable;
determining a priority of occupation of the wireless channel for the plurality of application programs based on one or more features of the plurality of application programs;
adaptively activating and deactivating the application program based on whether the status of the wireless channel satisfies one or more requirements of the application program, and based on the determined priority of occupation for the plurality of application programs; and
displaying the first mode or the second mode based on a result of the determination; and changing an appearance of a menu setting of the application program on a screen of a user terminal, by resetting a display scheme of the menu screen of the application program based on the status of the wireless channel, information about the requirements of the at least one application program, and the determined priority of occupation for the plurality of application programs, wherein the resetting comprises at least one of displaying a different color of the corresponding menu, hiding an inexecutable function among functions from the menu, and changing the corresponding menu screen by effects that are applicable to an icon.

17. The method of claim 16, wherein:

the first mode displays a first form of an icon corresponding to the application program, and the second mode displays a second form of the icon corresponding to the application program, and the second form is different from the first form.

18. The method of claim 17, wherein:

the first form of the icon corresponds to a colored icon, and the second form of the icon corresponds to a grayscale icon.

19. The method of claim 17, wherein:

the first form of the icon has a relatively low clarity in comparison to the second form, and the second form of the icon has a relatively high clarity in comparison to the first form.

20. The method of claim 17, wherein:

the first form of the icon has a greater size in comparison to the second form.

21. The method of claim 17, wherein the first form of the icon has a shape that has an animation effect that is different from the shape of the second form.

22. A method of operating an apparatus in which a plurality of application programs are installed, the apparatus displaying a respective icon corresponding to each application program that indicates that the application program is executable, the method comprising:

monitoring a status of a wireless channel;

determining a priority of occupation of the wireless channel for the plurality of application programs based on one or more features of the plurality of application programs;

adaptively activating and deactivating an application program from the plurality of application programs based on whether the status of the wireless channel satisfies requirements of the application program, and based on the determined priority of occupation for the plurality of application programs;

displaying the icon by changing a form of the icon, in response to the deactivating of the application program; and changing an appearance of a menu setting of the application program on a screen of a user terminal, by resetting a display scheme of the menu screen of the application program based on the status of the wireless channel, information about the one or more requirements of the application program, and the determined priority of occupation or the plurality of application programs, wherein the resetting comprises at least one of displaying a different color of the corresponding menu, hiding an inexecutable function among functions from the menu, and changing the corresponding menu screen by effects that are applicable to an icon.

23. The method of claim 22, wherein the icon, in the changed form, corresponds to a grayscale icon.

24. The method of claim 22, wherein the icon, in the changed form, corresponds to an icon having a higher clarity.

25. The method of claim 22, wherein the icon, in the changed form, corresponds to an icon having a smaller size.

26. The method of claim 22, wherein the icon, in the changed form, corresponds to an icon having a shape changed by an animation effect.

\* \* \* \* \*